United States Patent
Ooshima et al.

(10) Patent No.: US 7,455,153 B2
(45) Date of Patent: Nov. 25, 2008

(54) DISC BRAKE

(75) Inventors: Harumi Ooshima, Kofu (JP); Jun Watanabe, Kofu (JP); Junichi Hashimoto, Yamanashi-ken (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/779,393

(22) Filed: Feb. 13, 2004

(65) Prior Publication Data
US 2004/0195057 A1    Oct. 7, 2004

(30) Foreign Application Priority Data
Apr. 7, 2003    (JP)    ............... 2003-103166

(51) Int. Cl.
F16D 65/38    (2006.01)
F16D 65/00    (2006.01)

(52) U.S. Cl. ................. 188/73.38; 188/73.37; 188/340; 188/18 A

(58) Field of Classification Search ............... 188/18 A, 188/71.3, 72.3, 73.1, 73.32, 73.36, 73.37, 188/73.38, 73.39, 340
See application file for complete search history.

(56) References Cited

U.S. PATENT DOCUMENTS

| | | | | |
|---|---|---|---|---|
| 4,219,105 A | * | 8/1980 | Delaunay | 188/73.38 |
| 5,069,313 A | * | 12/1991 | Kato et al. | 188/72.3 |
| 5,934,417 A | * | 8/1999 | Kobayashi et al. | 188/72.3 |
| 5,947,233 A | * | 9/1999 | Kobayashi et al. | 188/72.3 |
| 6,179,095 B1 | * | 1/2001 | Weiler et al. | 188/73.38 |
| 6,223,866 B1 | * | 5/2001 | Giacomazza | 188/73.38 |
| 6,378,665 B1 | * | 4/2002 | McCormick et al. | 188/72.3 |
| 6,427,810 B2 | | 8/2002 | Schorn et al. | 188/73.39 |
| 6,478,122 B1 | * | 11/2002 | Demoise et al. | 188/73.38 |
| 6,920,965 B2 | | 7/2005 | Burgdorf et al. | 188/73.38 |
| 2002/0043436 A1 | * | 4/2002 | Burgdorf et al. | 188/73.38 |

FOREIGN PATENT DOCUMENTS

| | | | |
|---|---|---|---|
| JP | 2000-220670 A | * | 8/2000 |
| JP | 2001-193769 | | 7/2001 |
| JP | 2002-327780 | | 11/2002 |

OTHER PUBLICATIONS

Machine translation of JP-2002-327780.*

* cited by examiner

*Primary Examiner*—Melody M Burch
(74) *Attorney, Agent, or Firm*—Brinks Hofer Gilson & Lione

(57) ABSTRACT

One of brake pads 5 is pressed against the disc rotor D by a piston of a caliper 3 which is floatably supported on the carrier 2, and in reaction thereto, the other brake pad 5 is pressed against the disc rotor D by a claw portion 14 on the caliper 3, thereby producing a braking force. During brake release, the spring force of a return spring 22 separates the brake pad 5 from the disc rotor D. A positioning convex portion 27 is provided on the carrier 2 in a standing position adjacent to the return spring 22, and serves to restrict the sideward movement of the distal end portion of the return spring 22. Thus displacement and deformation of the return spring can be prevented, and its functions can be maintained.

9 Claims, 6 Drawing Sheets

DISC BRAKE

FIELD OF THE INVENTION

The present invention relates to a disc brake used in the braking of a vehicle such as an automobile.

DESCRIPTION OF THE RELATED ART

An example of a disc brake installed in an automobile or the like is a caliper floating-type disc brake in which brake pads disposed on either side of a disc rotor which rotates together with the wheels are supported by a carrier which is fixed on the vehicle body side, and a caliper comprising a cylinder portion which is installed with a piston opposing one of the brake pads and a claw portion opposing the brake pad on the opposite side across the disc rotor is floatably supported by the carrier.

In a caliper floating-type disc brake, one of the brake pads is pushed directly against the disc rotor by the forward motion of the piston, whereupon the caliper is caused to move in reaction thereto such that the other brake pad is pushed against the disc rotor via the claw portion. As a result, a braking force is generated. At this time, the brake pads which are dragged against the disc rotor abut against the torque receiving face of the carrier and thus receive braking torque.

However, problems have arisen in such caliper floating-type disc brakes in that if the brake pads do not return sufficiently during braking release, drag occurs, and the resultant increase in running resistance causes a deterioration in fuel economy. Furthermore, brake judder occurs when the brake pads become partially worn. Another problem arises at the beginning of braking in that when the brake pads are dragged against the disc rotor and impinge on the torque receiving face of the carrier, a so-called "clonk" sound is produced.

To solve these problems, as described in Japanese Unexamined Patent Application 2002-327780, for example, a return spring is conventionally attached to the brake pads. The resultant spring force separates the brake pads from the disc rotor and presses the brake pads against the torque receiving face of the carrier at all times, thereby preventing insufficient return of the brake pads and the generation of the clonk sound.

However, in this conventional caliper floating-type disc brake provided with a return spring, a worker may touch the return spring unintentionally during installation in a vehicle, washing of the vehicle, and so on, possibly causing deformation or displacement of the return spring.

SUMMARY OF THE INVENTION

The present invention has been designed in consideration of the above points, and it is an object thereof to provide a disc brake in which deformation and displacement of a return spring on the brake pads can be prevented.

In order to solve the problems described above, the present invention is a disc brake comprising a pair of brake pads disposed on either side of a disc rotor and pressed against the disc rotor by a piston, a supporting member attached on the vehicle body side which supports the pair of brake pads movably in the axial direction of the disc rotor, and a return spring having a base end portion attached to the brake pads and a distal end portion which presses the supporting member such that the brake pads are urged in a direction away from the disc rotor, wherein positioning means may be provided on the supporting member side in order to restrict the sideward movement of the distal end portion of the return spring.

According to such a constitution, displacement and deformation of the return spring are prevented by the positioning means.

Further, the present invention is a disc brake comprising a pair of brake pads disposed on either side of a disc rotor and pressed against the disc rotor by a piston, a supporting member attached on the vehicle body side which supports the pair of brake pads movably in the axial direction of the disc rotor, and a return spring having a base end portion attached to the brake pads and a distal end portion which presses the supporting member such that the brake pads are urged in a direction away from the disc rotor, wherein a protective convex portion having a protruding height of at least half the protruding height of the return spring may be provided in a standing position in the vicinity of the return spring of the supporting portion.

According to such a constitution, the return spring is protected from being unintentionally touched during work or the like by the protective convex portion.

DESCRIPTION OF THE PREFERRED EMBODIMENTS

Embodiments of the present invention will be described in detail below on the basis of the drawings.

Figure 1:
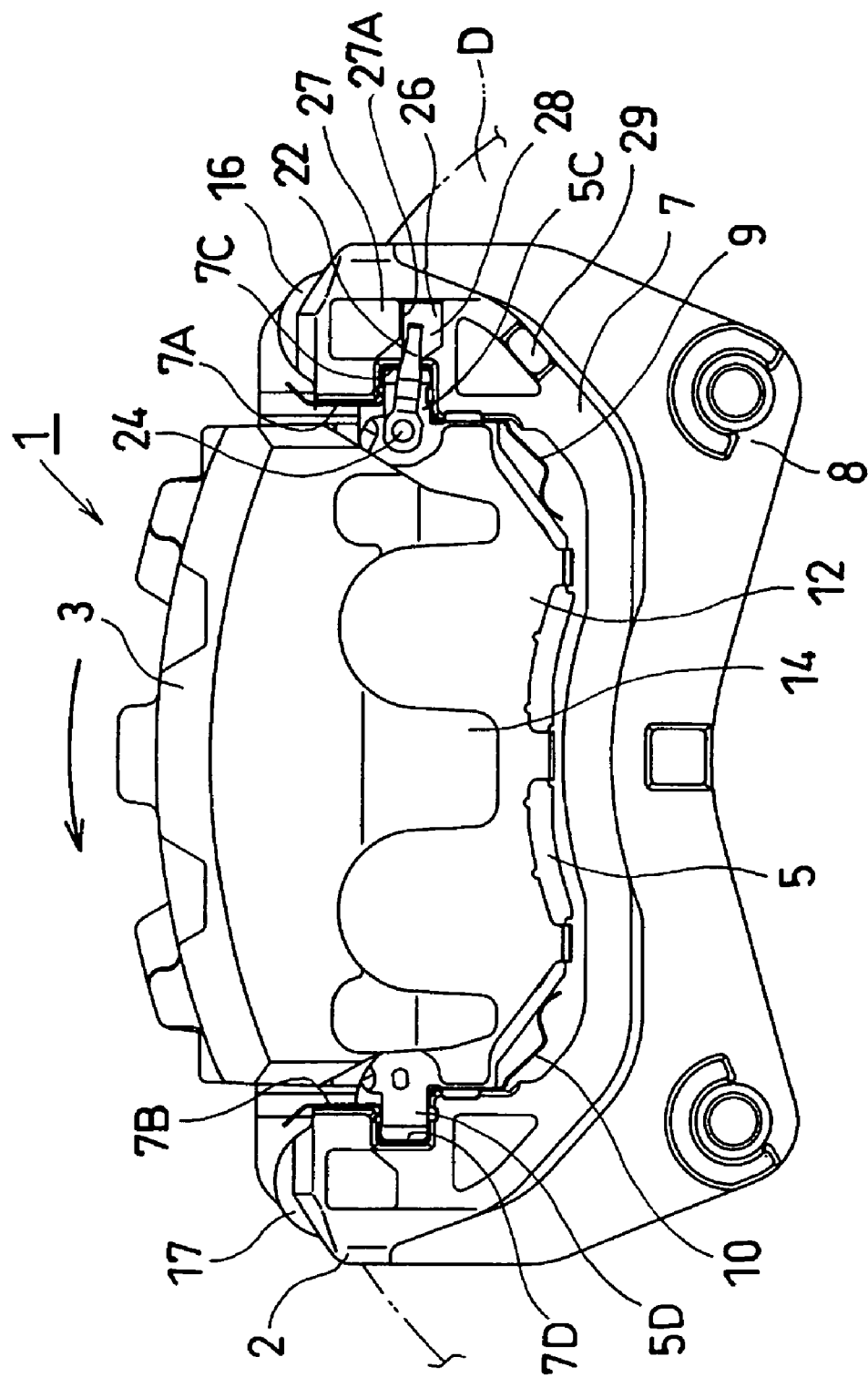
FIG. 1 is a side view of a disc brake according to a first embodiment of the present invention.
Figure 2:
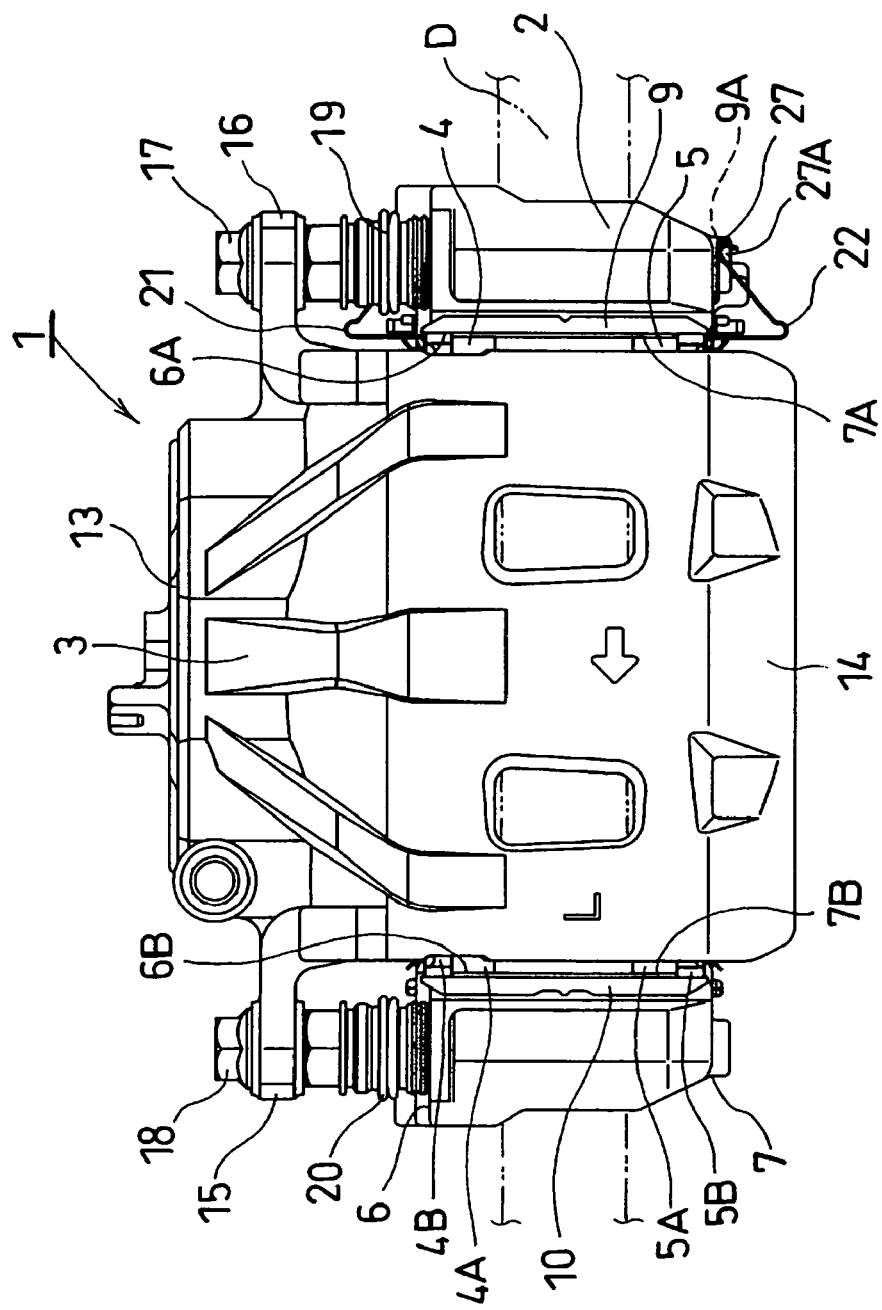
FIG. 2 is a plan view of the apparatus shown in FIG. 1.
Figure 3:
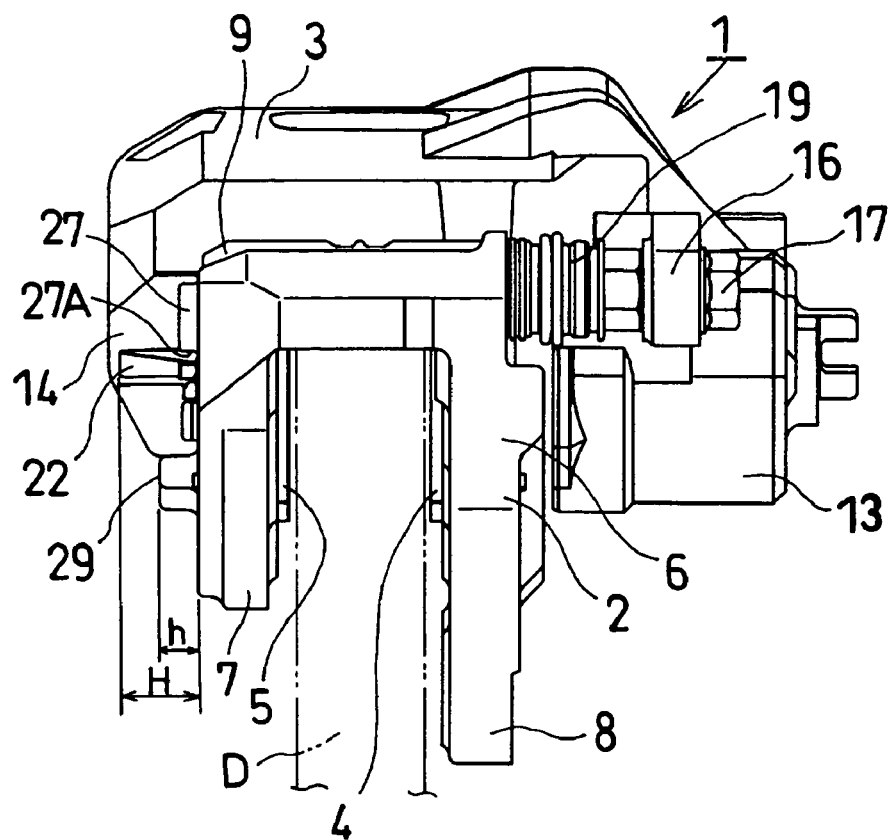
FIG. 3 is a front view of the apparatus shown in FIG. 1.

A first embodiment of the present invention will be described with reference to FIGS. 1 through 3. As shown in FIGS. 1 through 3, a disc brake 1 of this embodiment is a caliper floating-type disc brake comprising a disc rotor D which rotates together with the vehicle wheel, a carrier 2 (supporting member) fixed on the vehicle body side, a caliper 3 which is floatably supported on the carrier 2, and a pair of brake pads 4, 5 which are disposed on either side of the disc rotor D and supported by the carrier 2.

The carrier 2 supports the pair of brake pads 4, 5 by means of respective support portions 6, 7 disposed across and on either side of the disc rotor D. An attachment portion 8 formed on the support portion 6 which is disposed further toward the inside of the vehicle body than the disc rotor D is typically fixed by bolts or the like to a member on the vehicle body side such as a knuckle. Inward-facing torque receiving faces 6A, 6B and 7A, 7B are formed respectively on the support portions 6, 7 at the two ends thereof in the rotational direction of the disc rotor D, which is illustrated by an arrow in the drawing, and rectangular guiding grooves 7C, 7D extending in the axial direction of the disc rotor D are formed respectively on the torque receiving faces 7A, 7B. Other rectangular guiding grooves (not shown in the drawings) extending in the axial direction of the disc rotor D are formed respectively on the torque receiving faces 6A, 6B.

The brake pads 4, 5 are constituted by friction members 4A, 5A that are pushed against the disc rotor D and rear plates 4B, 5B which are tightly fixed to and thereby support the friction members 4A, 5A. Rectangular ear portions 5C, 5D protrude respectively from the two ends of the rear plates 5B. Other rectangular ear portions (not shown in the drawing) protrude respectively from the two ends of the rear plates 4B. By inserting the rear plates 4B and 5B respectively between the inward-facing torque receiving faces 6A, 6B and 7A, 7B of the carrier 2 and fitting the ear portions 5C, 5D of the brake pad 5 into the guiding grooves 7C, 7D, of the torque receiving faces 7A, 7B, the brake pads 4, 5 are slidably supported along the axial direction of the disc rotor D by the carrier 2. Likewise, by fitting the ear portions of the brake pad 4 into the guiding grooves of the torque receiving faces 6A, 6B, the brake pad 4 is slidably supported along the axial direction of the disc rotor D by the carrier 2.

One pad spring 9 (guiding member) attached on the carrier 2 side is interposed between the torque receiving faces 6A, 7A, and one end of the rear plates 4B, 5B of the brake pads 4, 5. One more pad spring 10 attached on the carrier 2 side is interposed between the torque receiving faces 6B, 7B, and the other end of the rear plates 4B, 5B. The pads springs 9, 10 enable the brake pads 4, 5 to move smoothly and protect the carrier 2. A shim 12 is attached to the rear face of the rear plates 4B, 5B of the brake pads 4, 5 to prevent brake noise. A shim (not shown in the drawings) similar to the shim 12 is attached to the rear face of the rear plate 4B to prevent brake noise.

A cylinder portion 13 installed with two pistons (not shown) opposing one of the brake pads 4 is provided in the caliper 3, and a claw portion 14 opposing the other brake pad 5 is formed on the other side of the disc rotor D. By respectively attaching sliding pins 17, 18 to arm portions 15, 16 formed on the two ends of the caliper 3 and slidably inserting these sliding pins 17, 18 into guiding holes (not shown) provided in the two ends of the carrier 2, the caliper 3 is supported floatably and movably along the axial direction of the disk rotor D. Note that in the drawings, the reference numerals 19, 20 designate pin boots for protecting the sliding pins 17, 18.

Return springs 21, 22 are attached to the rear plates 4B, 5B of the brake pads 4, 5 at the respective front end portions thereof in the rotational direction of the disc rotor D. The return spring 22 is caulked to a protrusion 24 protruding from the base portion of the ear portion 5C on the rear plate 5B so as to extend away from the disc rotor D and extend at an incline toward the bottom portion side of the guiding groove 7C of the carrier 2. The distal end portion thereof is pressed against a contact portion 26 of the pad spring 9 which extends along the surface of the support portion 7 of the carrier 2. The return spring 21 is likewise caulked to a protrusion (not shown in the drawings) protruding from the base portion of the ear portion of the rear plate 4B so as to extend away from the disc rotor D and extend at an incline toward the bottom portion side of the guiding groove of the support portion 6 of the carrier 2. The distal end portion thereof is pressed against another contact portion (not shown in the drawings) of the pat spring 9 which extends along the surface of the support portion 6 of the carrier 2. Due to the spring force of the return springs 21, 22, the brake pads 4, 5 are urged in a direction away from the disc rotor D at all times.

Note that the spring force of the return springs 21, 22 may also be used to press the brake pads 4, 5 against the torque receiving faces 6B, 7B to the rear of the rotation direction of the disc rotor D at all times by raising the distal end portions of the contact portions 25, 26 from the surface of the carrier 2 and pressing the distal end portions of the return springs 21, 22 against these raised portions.

A positioning convex portion 27 is provided in a standing position on the surface of the support portion 7 of the carrier 2, and adjacent to the outside of the contact portion 26 against which the distal end portion of the return spring 22 is pressed in the diametrical direction of the disc rotor D. A wall portion 27A of the positioning convex portion 27 which opposes the return spring 22 restricts sideward movement of the distal end portion of the return spring 22. The contact portion 26 of the pad spring 9 extends to the opposite side of the positioning convex portion 27, and due to this expanded portion 28, the distal end portion of the return spring 22 is unlikely to separate from the contact portion 26 when moving to the opposite side from the positioning convex portion 27.

A protective convex portion 29 is provided in a standing position integrally with the surface of the support portion 7 of the carrier 2 in the vicinity of the return spring 22 (in the example in the drawings, to the inside of the return spring 22 in the diametrical direction of the disc rotor D). As shown in FIG. 3, the protruding height h of the protective convex portion 29 is set at approximately half the protruding height H of the return spring 22 to prevent interference with other components (not shown) such as the wheel, but is preferably set to at least half the protruding height H of the return spring 22 and may be set to the protruding height H or more.

Operations of this embodiment constituted as described above will now be described.

When brake fluid is supplied to the cylinder portion 13 from a master cylinder (not shown), the piston moves forward to push the brake pad 4 against the disc rotor D. In reaction thereto, the caliper 3 moves, whereby the claw portion 14 presses the brake pad 5 against the disc rotor D to generate a braking force. At this time, the brake pads 4, 5 which are dragged against the disc rotor D abut against the torque receiving faces 6B, 7B of the carrier 2 with the pad spring 10 interposed therebetween, and hence receive braking torque.

When the fluid pressure of the brake fluid from the master cylinder is released, the piston retreats, and the spring force of the return springs 21, 22 causes the brake pads 4, 5 to separate from the disc rotor D such that braking is released. By means of the spring force of the return springs 21, 22, the brake pads 4, 5 can be reliably separated from the disc rotor D, thereby preventing drag on the brakes, fuel economy deterioration, and brake judder.

Further, in cases where the brake pads 4, 5 are pressed against the torque receiving faces 6B, 7B to the rear of the rotation direction of the disc rotor D by the spring force of the return springs 21, 22 at all times, as described above, the clonk sound which is produced at the beginning of braking when the brake pads 4, 5 drag against the disc rotor D and impinge on the torque receiving faces 6B, 7B can be prevented.

By standing the positioning convex portion 27 on the supporting portion 7 of the carrier 2 to restrict movement of the distal end portion of the return spring 22, and by providing the extended portion 28 on the contact portion 26 of the pad spring 9 against which the distal end portion of the return spring 22 is pressed, deformation and displacement of the return spring can be prevented even when a worker touches the return spring 22 unintentionally when attaching the disc brake 1 to a vehicle, washing the vehicle, and so on, and thus the function of the return spring 22 can be maintained.

In the embodiment described above, the positioning convex portion 27 is disposed on one side of the return spring 22, and the extended portion 28 of the contact portion 26 is formed on the opposite side. Note, however, that movement of the distal end portion of the return spring 22 may be restricted by providing another positioning convex portion on the opposite side instead of the extended portion 28.

Further, the protective convex portion 29 is provided in a standing position in the vicinity of the return spring 22 on the support portion 7 of the carrier 2, and hence when the disc brake 1 is placed on a flat surface with the claw portion 14 facing downward during installation of the disc brake 1 into a vehicle, the claw portion 14 and protective convex portion 29 contact the flat surface, but the return spring 22 does not contact the flat surface. Similarly, if a washing instrument or the like contacts the disc brake 1 during washing of the vehicle and so on, the claw portion 14 and protective convex portion 29 may contact the washing instrument or the like, but the return spring 22 is prevented from or becomes less likely to contact the washing instrument or the like. Thus the return spring 22 can be protected from unintentional contact or the like during installation of the disc brake 1 into a vehicle, washing of the vehicle, and so on, and hence deformation and displacement of the return spring 22 can be prevented. Note that the height h of the protective convex portion 29 is set at approximately half the protruding height H of the return spring 22 to avoid interference with other components such as the wheel, but in order to obtain a sufficient protective effect, the height h is preferably set to at least half the protruding height H of the return spring 22, and may be set at the protruding height H of the return spring 22 or more.

Next, second to fourth embodiments of the present invention will be described with reference to FIGS. 4 through 6. Note that in the following descriptions, identical reference numbers to those in the first embodiment have been allocated to identical parts, and only different parts will be described in detail.

Figure 4:
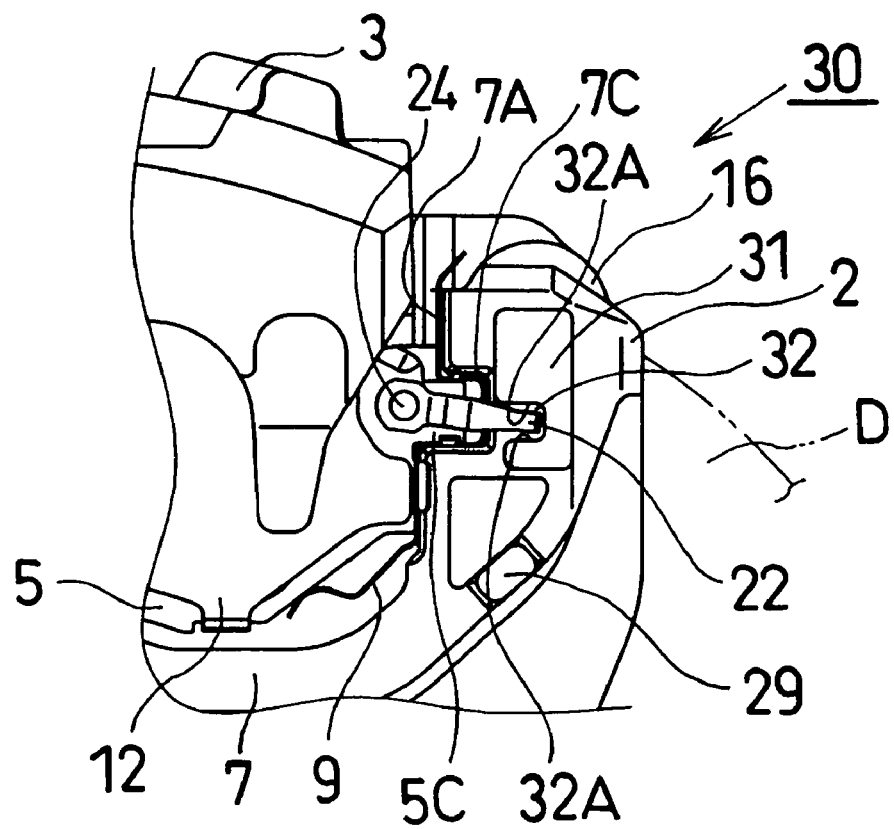
FIG. 4 is a side view of the main parts of a disc brake according to a second embodiment of the present invention.

As shown in FIG. 4, in a disc brake 30 according to a second embodiment of the present invention, in contrast to the first embodiment described above, the contact portion 26 of the pad spring 9 is omitted, and the distal end portion of the return spring 22 is caused to contact the surface of the support portion 7 of the carrier 2 directly. Further, a positioning convex portion 31 having an inverse "C" form is provided in a standing position on the surface of the support portion 7, and the distal end portion of the return spring 22 is inserted into a rectangular groove portion 32 of the positioning convex portion 31. Sideward movement of the distal end portion of the return spring 22 is restricted by a wall portion 32A on the inside of the groove portion 32.

Hence deformation and displacement of the return spring 22 can be prevented, and the same actions and effects as those of the first embodiment can be realized.

Figure 5:
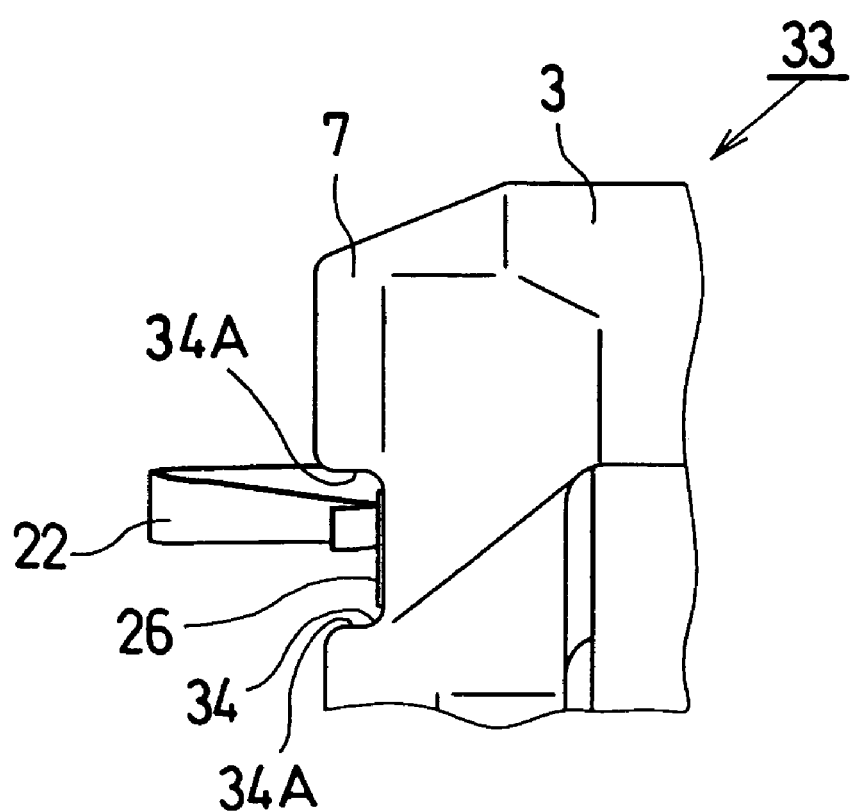
FIG. 5 is an enlarged front view of the main parts of a disc brake according to a third embodiment of the present invention.

As shown in FIG. 5, in a disc brake 33 according to a third embodiment of the present invention, in contrast to the first embodiment described above, the extended portion 28 formed on the contact portion 26 of the pad spring 9 is omitted, and a rectangular concave portion 34 is formed on the surface of the support portion 7 of the carrier 2 instead of the positioning convex portion 27. The contact portion 26 of the pad spring 9 and the distal end portion of the return spring 22 are inserted into this concave portion 34, and sideward movement of the distal end portion of the return spring 22 is restricted by a wall portion 34A on the inside of the concave portion 34.

Hence deformation and displacement of the return spring 22 can be prevented, and the same actions and effects as those of the first embodiment can be realized.

Figure 6:
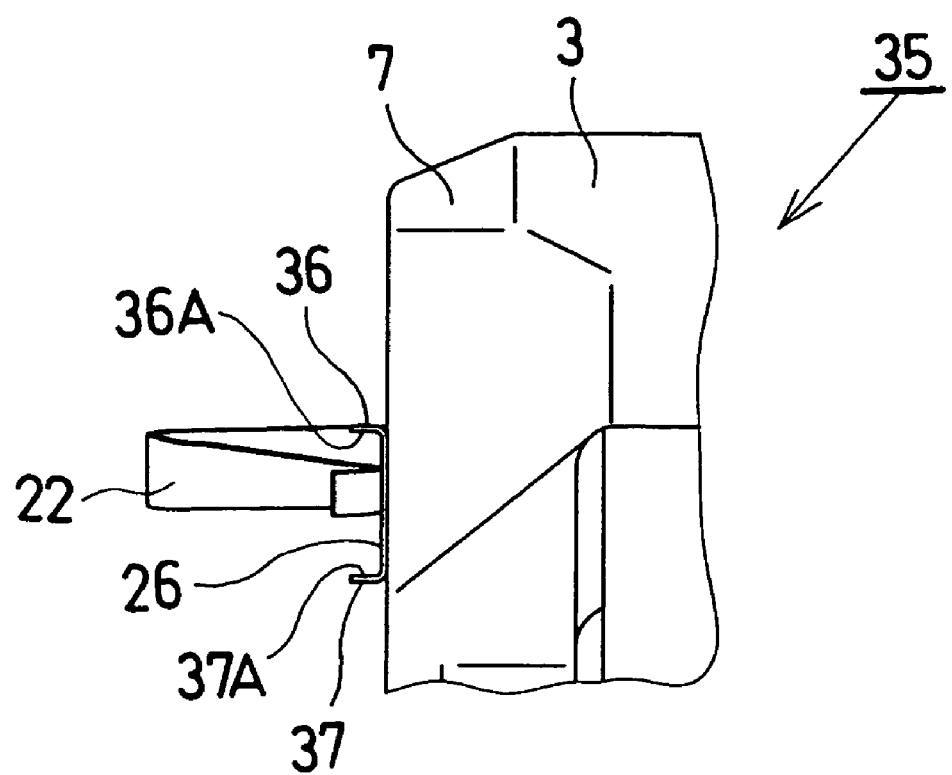
FIG. 6 is an enlarged front view of the main parts of a disc brake according to a fourth embodiment of the present invention.

As shown in FIG. 6, in a disc brake 35 according to a fourth embodiment of the present invention, in contrast to the first embodiment described above, the positioning convex portion 27 and the extended portion 28 of the pad spring 9 are omitted, and in place thereof, raised portions 36, 37 are formed across the two side portions of the contact portion 26 of the pad spring 9. Sideward movement of the distal end portion of the return spring 22 is restricted by wall portions 36A, 37A on the inside of the raised portions 36, 37.

Hence deformation and displacement of the return spring 22 can be prevented, and the same actions and effects as those of the first embodiment can be realized.

Further, by combining the first embodiment and fourth embodiment, movement of the distal end portion of the return spring 22 to one side may be restricted by the positioning convex portion 27 provided on the support portion 7 of the carrier 2, and movement of the distal end portion of the pad spring 9 to the other side may be restricted by the raised portion 37 provided on the contact portion 26 of the pad spring 9.

Note that in the first through fourth embodiments, an example in which the present invention is applied to a caliper floating-type disc brake is described, but the present invention is not limited thereto, and may be applied similarly to any type of disc brake having a supporting member for supporting the brake pads and a return spring attached to the brake pads, such as an opposing piston type disc brake.

According to the disc brake in each of the embodiments described above, by providing positioning means, displacement and deformation of the return spring caused when a worker unintentionally touches or otherwise interferes with the return spring during installation in a vehicle, washing of the vehicle, or the like can be prevented, and thus the functions of the return spring can be maintained.

The invention claimed is:

1. A disc brake for a vehicle comprising:
a pair of brake pads configured to press a disc rotor between them;
a supporting member that is fixable on the vehicle and supports the pair of brake pads for movement in an axial direction of the disc rotor;
a return spring that has a base end attached to one of the brake pads and a distal end configured to press the supporting member so as to urge, by reaction, the one of the brake pads in the axial direction away from the disc rotor, wherein the return spring extends from the base end generally in the axial direction away from the brake pad and is folded back to extend towards the brake pad so that the distal end presses the supporting member; and
at least one wall that elevates from the supporting member adjacent to the return spring to limit a clockwise or counter clockwise movement of the distal end around the base end relative to the supporting member, wherein the return spring abuts in a rotational direction thereof against the at least one wall, and a reaction force received by the return spring from the at least one wall upon abutment against the at least one wall, exclusive of a frictional force from the at least one wall, comprises some force acting against the return spring in the direction opposite to the rotational direction of the return spring,
wherein the at least one wall elevates adjacent to the return spring so as to limit the clockwise or counter clockwise movement thereof which may occur substantially perpendicular to a rotational direction of the disc rotor,
wherein the wall is integral with the supporting member, and
wherein the disc brake further comprises a guiding member provided between the one of the brake pads and the supporting member, wherein the guiding member comprises a contact portion which is in contact with the distal end of the return spring and pressed thereby.

2. A disc brake according to claim 1, wherein the at least one wall comprises two walls that elevate adjacent to both edges of the return spring so as to limit both the clockwise and counter clockwise movements of the distal end around the base end.

3. A disc brake according to claim 1, further comprising another return spring that has a base end attached to the other one of the brake pads and a distal end configured to press the supporting member so as to urge by reaction the other one of the brake pads away from the disc rotor.

4. A disc brake for a vehicle comprising:
a pair of brake pads configured to press a disc rotor between them;
a supporting member that is fixable on the vehicle and supports the pair of brake pads for movement in an axial direction of the disc rotor;
a return spring that has a base end attached to one of the brake pads and a distal end configured to press the supporting member so as to urge, by reaction, the one of the brake pads in the axial direction away from the disc rotor, wherein the return spring extends from the base end generally in the axial direction away from the brake pad and is folded back to extend towards the brake pad so that the distal end presses the supporting member; and
at least one wall that elevates from the supporting member adjacent to the return spring to limit a clockwise or counter clockwise movement of the distal end around the base end relative to the supporting member, wherein the return spring abuts in a rotational direction thereof against the at least one wall, and a reaction force received by the return spring from the at least one wall upon abutment against the at least one wall, exclusive of a frictional force from the at least one wall, comprises some force acting against the return spring in the direction opposite to the rotational direction of the return spring,
wherein the disc brake further comprising a guiding member provided between the one of the brake pads and the supporting member, wherein the guiding member comprises a contact portion which is in contact with the distal end of the return spring and pressed thereby.

5. A disc brake according to claim 4, wherein the at least one wall is integral with the guiding member.

6. A disc brake according to claim 4, wherein the at least one wall elevates adjacent to the return spring so as to limit the clockwise or counter clockwise movement thereof which may occur substantially perpendicular to a rotational direction of the disc rotor, and wherein the at least one wall comprises two walls that elevate adjacent to both edges of the return spring so as to limit both the clockwise and counter clockwise movements of the distal end around the base end.

7. A disc brake according to claim 6, wherein at least one of the two walls is integral with the supporting member.

8. A disc brake for a vehicle comprising:
a pair of brake pads configured to press a disc rotor between them;
a supporting member that is fixable on the vehicle and supports the pair of brake pads for movement in an axial direction of the disc rotor;
a return spring that has a base end attached to one of the brake pads and a distal end configured to press the supporting member so as to urge, by reaction, the one of the brake pads in the axial direction away from the disc rotor, wherein the return spring extends from the base end generally in the axial direction away from the brake pad and is folded back to extend towards the brake pad so that the distal end presses the supporting member; and
at least one wall that elevates from the supporting member adjacent to the return spring to limit a clockwise or counter clockwise movement of the distal end around the base end relative to the supporting member, wherein the return spring abuts in a rotational direction thereof against the at least one wall, and a reaction force received by the return spring from the at least one wall upon abutment against the at least one wall, exclusive of a frictional force from the at least one wall, comprises some force acting against the return spring in the direction opposite to the rotational direction of the return spring,
wherein the at least one wall comprises two walls that elevate adjacent to both edges of the return spring so as to limit both the clockwise and counter clockwise movements of the distal end around the base end, and
wherein the disc brake further comprises a guiding member provided between the one of the brake pads and the supporting member, wherein the guiding member comprises a contact portion which is in contact with the distal end of the return spring and pressed thereby.

9. A disc brake according to claim 8, wherein at least one of the two walls is integral with the guiding member.

* * * * *